United States Patent [19]

Hagiwara

[11] 4,161,105
[45] Jul. 17, 1979

[54] TANDEM MASTER CYLINDER

[75] Inventor: Yutaca Hagiwara, Fujisawa, Japan

[73] Assignee: Nissan Motor Company, Limited, Japan

[21] Appl. No.: 821,813

[22] Filed: Aug. 4, 1977

[30] Foreign Application Priority Data

Aug. 9, 1976 [JP] Japan .................................. 51/94624

[51] Int. Cl.² .......................... B60T 11/06; B60T 11/24
[52] U.S. Cl. ......................................... 60/561; 60/562; 60/589; 60/592
[58] Field of Search .................. 60/562, 581, 588, 561, 60/589, 592

[56] References Cited

U.S. PATENT DOCUMENTS

| | | | |
|---|---|---|---|
| 3,117,421 | 1/1964 | Stelzer | 60/562 |
| 3,376,704 | 4/1968 | Ihnacik, Jr. | 60/581 |
| 3,382,675 | 5/1968 | Wallace | |
| 3,605,410 | 9/1971 | Herriott | 60/562 |

FOREIGN PATENT DOCUMENTS

| | | |
|---|---|---|
| 1170802 | 7/1962 | Fed. Rep. of Germany ............. 60/562 |
| 7338210 | 10/1972 | Fed. Rep. of Germany. |
| 2203730 | 10/1972 | France. |

*Primary Examiner*—Abraham Hershkovitz
*Attorney, Agent, or Firm*—Lane, Aitken & Ziems

[57] ABSTRACT

A tandem master cylinder comprises two pistons, one of which includes a cylindrical bore for receiving therein the other piston, and limiting means for limiting the axial movement of the other piston.

1 Claim, 1 Drawing Figure

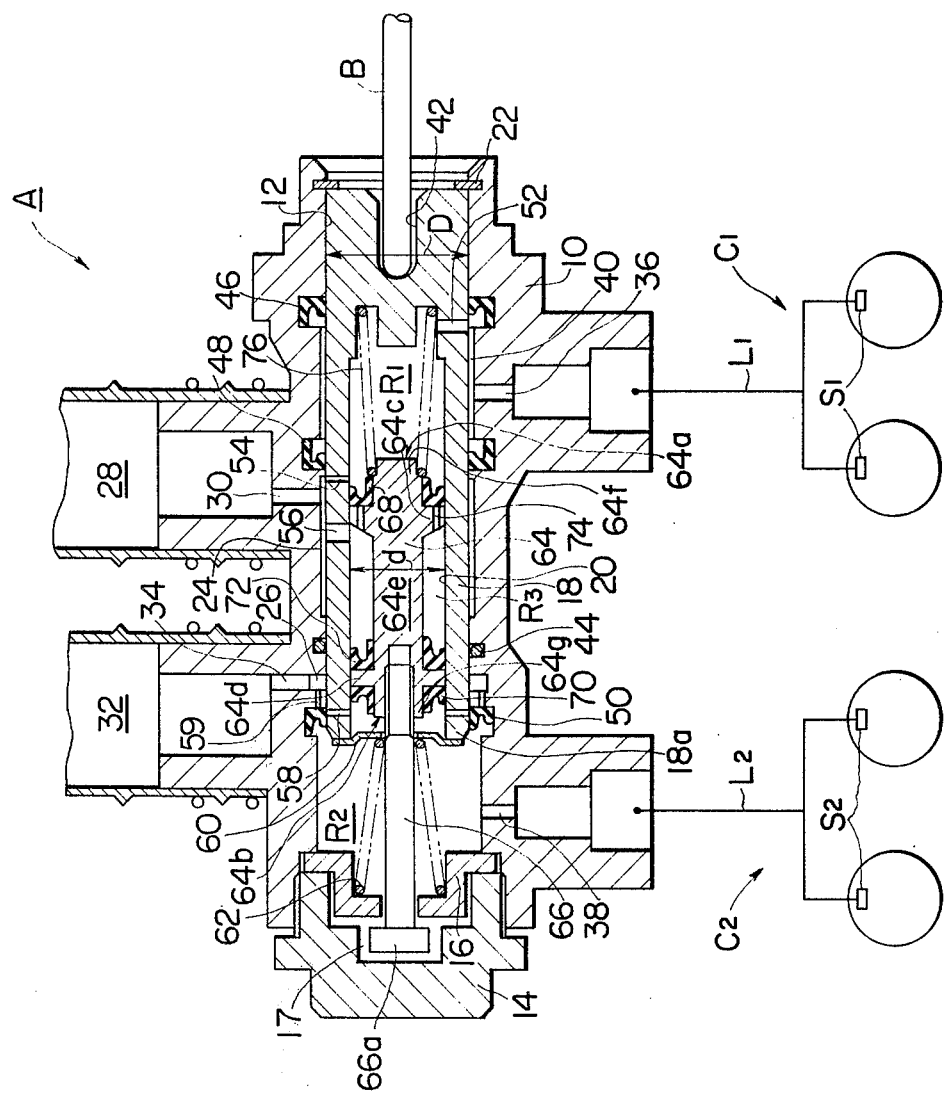

TANDEM MASTER CYLINDER

BACKGROUND OF THE INVENTION

The present invention relates generally to dual circuit hydraulic braking systems for automotive vehicles and, more particularly to tandem master cylinders incorporated in such braking systems.

Conventional dual circuit braking systems are provided with tandem master cylinders which are hydraulically connected to the dual circuits of the braking systems for therethrough applying the brakes on front and rear sets of vehicle wheels.

Such braking systems encounter a drawback that the failure of one circuit leads to losses in pedal stroke, in other words, an increase in pedal movement before braking effect is obtained and further encounter a drawback that the braking effect obtained by the braking system with one broken-down circuit is reduced to half by the intact system for the same pedal force.

This deterioration in braking performance can give the driver a shock and will create a panic situation.

It is known in the art that tandem master cylinders cause such drawbacks of the braking system with one broken-down circuit.

To overcome the above drawbacks, various tandem master cylinders have therefore been proposed but ended in failure because the tandem master cylinders having hitherto been proposed still lead to considerable large losses in pedal stroke and still require increased pedal force in the event of failure of the braking system and, further, because the conventional tandem master cylinders have complicated construction and large size, particularly with respect to their axial length, which disadvantageously increases the manufacturing cost.

SUMMARY OF THE INVENTION

It is accordingly an object of the present invention to provide a tandem master cylinder which eliminates the foregoing drawbacks of a dual circuit hydraulic braking system when incorporated therein in place of a conventional one.

It is another object of the present invention to provide a tandem master cylinder which is simple in construction and compact, particularly with respect to its axial length.

It is a further object of the present invention to provide a tandem master cylinder which improves the braking performance of a dual circuit hydraulic braking system.

These and other objects and features of the present invention will become apparent from the following description given by way of an example with reference to the accompanying single drawing.

BRIEF DESCRIPTION OF THE DRAWING

The only FIGURE shows the cross-sectional view of a tandem master cylinder according to the present invention and diagrammatically illustrated portions of a hydraulic braking system.

DESCRIPTION OF THE PREFERRED EMBODIMENT

In the drawing, a tandem master cylinder according to the present invention is generally denoted by reference character A. The tandem master cylinder A comprises a housing 10 which is formed with a main cylindrical bore 12 extending axially of the housing. One end of the main cylindrical bore 12, which is the left-hand end in the drawing, is sealingly closed by a screw plug 14 which is fixedly secured to the housing 10 by interposing therebetween a stopper plate 16. The screw plug 14 and the stopper plate 16 are co-operatively shaped to form therebetween a cavity 17 for the purpose which will be explained hereinlater.

The main cylindrical bore 12 axially slidably receives therein a primary piston 18, which is formed with a secondary cylindrical bore 20 having an axis substantially in parallel with the axis of the main cylindrical bore 12. Preferably, the axis of the secondary cylindrical bore 20 is in coaxial alignment with the axis of the main cylindrical bore 12, as illustrated in the drawing. One end of the secondary cylindrical bore 20, which is a right-hand end in the drawing, is closed by the end portion of the primary piston 18.

A snap ring 22 is fixed to an inner wall surface of the housing at the right-hand end thereof, which inner wall surface defines the main cylindrical bore 12. The position of this snap ring 22 in the housing determines the most rightward position of the primary piston 18, which is a rest position thereof as will be apparent as the description proceeds.

Axially spaced annular grooves 24 and 26 are formed in the inner wall surface of the housing 10. The groove 24 is axially far wider than the other and hydraulically communicates with a first hydraulic fluid reservoir or a first hydraulic fluid source 28 through a first port inlet 30 formed in the housing, and the other groove 26 hydraulically communicates with a second hydraulic fluid reservoir or a second hydraulic fluid source 32 through a second port inlet 34 formed in the housing.

At the axially outside locations with respect to the first and second port inlets 30 and 34, axially spaced first and second port outlets 36 and 38 are also formed in the housing 10. The first port outlet 36 opens into the interior of the housing through an axially wide annular groove 40 and the second port outlet 38 directly opens into the interior of the housing. The first and second port outlets are hydraulically connected to first and second circuits $C_1$ and $C_2$ respectively. The first and second circuits $C_1$ and $C_2$ respectively comprise first and second sets of brake cylinders $S_1$ and $S_2$, e.g., front and rear brake cylinders for applying the brakes on front and rear vehicle wheels, which sets of brake cylinders are respectively connected to the first and second port outlets 36 and 38 through piping $L_1$ and $L_2$.

The primary piston 18 is formed at its right-hand end with an axial recess 42 for receiving therein one end of a push rod B which is pivotally connected to a brake pedal (not shown). A plurality of resilient annular seals 44, 46, 48 and 50 are fixed on the inner wall of the housing and snugly encircle the periphery of the primary piston 18. The annular seal 44 in the form of an O-ring is positioned between the annular grooves 24 and 26, the two annular seals 46 and 48 are respectively positioned at the axial ends of the groove 40, and the annular seal 50 is positioned between the groove 26 and the second port outlet 38. A plurality of radially extending through openings 52, 54 and 56 are formed in the peripheral wall of the primary piston 18. The opening 52 is positioned adjacent to the closed end of the secondary bore 20 and provides communication between the groove 40 and the interior of the primary piston which is defined by the secondary bore. The openings 54 and 56 are provided for respectively establishing communication between the groove 24 and the interior of the primary piston.

The opening 54 has a larger bore than the opening 56. A plurality of radially extending openings 58 are further formed in the peripheral wall surface of the primary piston 18 adjacent to the open end 18a thereof. The openings 58 and the annular seal 50 are arranged to co-operate with one another for establishing communication between the groove 26 and the interior of the primary piston through openings 59 positioned between the groove 26 and the annular seal 50, and past the cup 50 when the primary piston 18 is at the most rightward position as shown in the drawing, and for obstructing such communication when the openings 58 are moved leftwardly past the annular seal 50.

A retainer plate 60 is fixedly positioned at the open end of the primary piston 18. A return spring 62 is arranged between the retainer plate 60 and the stopper plate 16. The return spring 62 biases the primary piston toward the right to its rest position or initial position as shown in the drawing.

A floating secondary piston 64 is slidably received in the secondary cylindrical bore 20 and co-operates with the first and secondary cylindrical bores to form at its axial ends first and second chambers $R_1$ and $R_2$, i.e., the first chamber $R_1$ is defined by one end 64a of the secondary piston and the inner wall surface of the primary piston which defines the closed side portion of the secondary cylindrical bore 20, and the second chamber $R_2$ is defined by the other end 64b of the secondary piston, the open end 18a of the primary piston and the closed side portion of the primary cylindrical bore. In the first and second chambers $R_1$ and $R_2$, high fluid pressure can be developed in response to the axial movement of the primary piston 18 in the leftward direction.

The secondary piston 64 is axially movable relative to the primary piston 18 in response to the pressure differential between the first and second chambers $R_1$ and $R_2$ for thereby equalizing the pressures in same. The tandem master cylinder according to the present invention is provided with limiting means for limiting the axial movement of the secondary piston with respect to the housing 10 or the main cylindrical bore with a predetermined small range even in occurrence of the pressure differential between the first and second chambers $R_1$ and $R_2$ becoming large enough to drive said secondary piston to move beyond the above predetermined range. The limiting means comprise the foregoing stopper plate 16 having the axial through opening and the screw plug 14 which co-operate to form therebetween the cavity 17 at the location axially adjacent to the second chamber $R_2$, and a bolt 66 having one end fixedly connected to the left-hand end of the primary piston and the other end extending into the cavity 17 through the opening of the stopper plate 16 to form a head portion 66a having a diameter larger than that of the bore formed through the stopper plate 16. The cavity 17 has axially opposing end wall surface between which the head portion 66a is positioned axially movably within the range in correspondence to the foregoing predetermined range. The bolt 66 is constructed that its head portion 66a may be positioned at the middle point between the opposing end walls when the pressure levels in the first and second chambers are equal.

The secondary piston 64 comprises axially opposed land portions 64c and 64d, a central stem portion 64e and axially outer stem portions 64f and 64g projecting from the opposed ends of the piston 64. Resilient annular seals 68 and 70 are provided at the axially opposed ends of the secondary piston and snugly encircle coaxial stem portions 64f and 64g. The annular seals 68 and 70 are operable to prevent the working fluid from leaking out from the first and second chambers through the peripheries of the land portions of the secondary piston. An annular seal 72 is provided to snugly encircle the central stem portion 64e at the axially inner side of the land portion 64d for hydraulically isolating the first chamber from the second chamber.

A plurality of axially extending apertures 74 are formed in the land portion 64c for therethrough supplying hydraulic fluid existing in an annular cavity $R_3$ into the first chamber past the annular seal 68, which cavity $R_3$ hydraulically communicates with the first fluid source 28 through the opening 56, the groove 24 and the first port inlet 30.

A spring 76 is disposed within the first chamber and seated at its one end on the primary piston and at its other end on the secondary piston so that the secondary piston can be biased toward its predetermined axial position with respect to the main cylindrical bore. The above predetermined axial position of the secondary piston is the position to which the secondary piston converges when the hydraulic pressures in the first and second chambers are precisely equal. The provision of the spring 76 is made for the further effect that the spring 76 may absorb the vibrations applied to the secondary piston and prevent same from fluctuating.

The locations of the foregoing through openings 52, 54 and 56 with respect to the secondary cylindrical bore 20 are respectively determined in such a manner that constant communication between the first chamber $R_1$ and the first port outlet 36 may be established through the openings 52 and the groove 40 independently of the position of the primary piston 18, and that when the primary piston 18 is at its rest position the opening 54 may be located axially adjacent to the annular seal 68 at the side thereof where the opening 54 establishes communication between the first chamber and the groove 24, and that the opening 56 may provide constant communication between the annular cavity $R_3$ and the groove 24 independently of the relative movement between the primary and secondary pistons.

The operation of the tandem master cylinder thus described and shown will be explained hereinafter.

(A) In case that the dual circuits of the braking system are both intact, the tandem master cylinder of the invention operates as follows in co-operation therewith:

When the brake pedal (not shown) is depressed, the push rod B moves leftwardly, causing the primary piston 18 to move in the corresponding direction. The openings 54 and 58 are accordingly moved leftwardly past the annular seals 68 and 50 and are positioned at the left side of same, respectively. The first and second chambers $R_1$ and $R_2$ are thus hydraulically isolated from the first and second hydraulic fluid sources 28 and 32, and the hydraulic pressures in the first and second chambers increase in response to the axial movement of the primary piston 18 in the leftward direction. If the pressures $P_1$ and $P_2$ respectively developed in the first and second chambers are not equal, the secondary piston 64 is caused to move axially by the pressure differential between them and regulates them to be equalized. The first set of brake cylinders $S_1$ is supplied with the pressure $P_1$ developed in the first chamber $R_1$ through the opening 52, the groove 40, the port outlet 36 and the piping $L_1$. The second set of brake cylinders $S_2$ is supplied with the pressure $P_2$ developed in the second chamber R₂ through the second port outlet 38 and the piping L₂.

Now, if d denotes the diameter of the secondary cylindrical bore 20, which is equal to the diameter of the land portions 64c and 64d and the outer diameter of the annular seals 68, 70 and 72, D denotes the peripheral diameter of the primary piston 18, which is equal to the diameter of the main cylindrical bore 12 and the inner diameter of the annular seals 46, 48 and 50, and F denotes the propellant force applied on the primary piston via the push rod B, the following equation will hold, neglecting the forces produced by the springs 62 and 76 since they are quite small as compared to the forces of P₁ and P₂:

$$F = P_1 \cdot (\pi/4)d^2 + P_2(\pi/4)(D^2 - d^2) \quad (1)$$

For equalizing the increases of the pressures $P_1$ and $P_2$, it suffices to equalize the effective areas through which the pedal force is transmitted to the hydraulic fluid respectively contained in the first and second chambers. From this, $D = \sqrt{2}d$ is deduced and the following relation will be obtained from equation (1):

$$P_1 = P_2 = \frac{1}{2} \cdot \frac{F}{\frac{\pi}{4} d^2} \quad (2)$$

When the brake pedal is released from depression and returns to its initial position, the primary piston 18 returns to its rest position biased by the springs 62 and 76. Subsequently, communications are established hydraulically between the first and second chambers and the first and second hydraulic fluid sources respectively. More specifically, the first chamber R₁ hydraulically communicates with the first hydraulic fluid source 28 through the opening 54, the groove 24 and the first port inlet 30. The second chamber R₂ hydraulically communicates with the second hydraulic fluid sources 32 through the opening 58, the openings 59, the groove 26 and the second port inlet wherein the opening 58 opens past the cup 50 into the openings 59. If the quick return of the primary piston 18 is the case, the first and second chambers are supplied with hydraulic fluid through the following passageways since the pressures in the first and second chambers reduce to vacuum. One of the above passageways, which established communication between the first chamber and the first hydraulic fluid source, is composed of the apertures 74, the opening 56, the groove 24 and the first port inlet since the apertures 74 open through the cup 68 into the first chamber. The other of the passageways, which establishes communication between the second chamber and the second hydraulic fluid source, is composed of the openings 59, the groove 26 and the second port inlet 34 since the openings 59 open past the cup 50 into the second chamber.

The annular seal 44 in the form of an O-ring is provided for isolating the hydraulic fluid in the first chamber from the hydraulic fluid in the second chamber.

(B) In the event of the failure of one of the dual circuits of the braking system, e.g., the failure of the first circuit C₁, the tandem master cylinder of the invention operates as follows in co-operation therewith:

In this case, the hydraulic pressure in the first chamber does not increase even in the presence of a propellant force which drives the primary piston in the leftward direction. The pressure in the second chamber increases in response to the propellant force when the openings 58 pass the annular seal 50 and are positioned at the left side thereof. When the pressure in the second chamber begins to rise, a pressure differential is created between the first and second chambers. Consequently, the secondary piston is caused to move rightwardly by the pressure differential and causes the pressure in the second chamber to stop rising. However, the axial movement of the secondary piston is limited to within a small range by means of limiting means, so that the pressure in the second chamber starts rising after a negligibly short delay. This results in eliminating the pedal losses conventionally occured in the failure of one circuit.

The tandem master cylinder of the invention has further features as follows. Since $P_1 = 0$ in the failure of the first circuit C₁, the hydraulic pressure $P_2'$ to be developed in the second chamber and the pedal force F will satisfy the following relation:

$$F = P_2' \cdot (\pi/4)(D^2 - d^2) \quad (3)$$

so that the pressure $P_2'$ can be expressed by the following equation when assuming $D = \sqrt{2}d$:

$$P_2' = \frac{F}{\frac{\pi}{4} d^2} \quad (4)$$

From equations (2) and (4), the relation between the pressures $P_1$ and $P_2$ is expressed by:

$$P_2' = 2 \cdot P_2 \quad (5)$$

As it will be understood from above, the hydraulic pressure $P_2'$ developed in the second chamber in the failure of the first circuit is two times the pressure $P_2$ which is developed in same for the same pedal force when both the first and second circuits are intact. As a result, an adequate braking force can be maintained even in the failure of the first circuit since, for example, the rear brakes can provide sufficient braking force with the rear vehicle wheels although the front brakes do not provide any braking force to the front vehicle wheels. In other words, the braking system can maintain as a whole constant braking capacity even in the failure of the first circuit.

From the above description, it will be understood that the failure of the first circuit of the braking system incorporated with the tandem master cylinder of the invention does not lead to such large losses in pedal stroke as that occured in the conventional braking system. Furthermore, the braking system with one broken down circuit can provide constant braking effect, so that such failure can not surprise or shock the driver.

Still furthermore, it will be understood that minimized losses in the pedal stroke is derived from the tandem master cylinder of the invention in which the ineffective stroke of the piston co-operating with the intact circuit does not increase whereby the axial length of the tandem master cylinder of the invention can be short as compared to the conventional one.

(C) In the event of failure of the other of the dual circuits of the braking system, e.g., the failure of the second circuit C₂, the tandem master cylinder according to the present invention operates as follows in co-operation therewith:

The pressure in the first chamber increases in response to the axial movement of the primary piston 18 when the opening 54 passes the annular seal 68 and is positioned at the left side thereof, however the pressure in the second chamber does not increase. Consequently, the secondary piston 64 moves leftwardly and causes the pressure in the first chamber to stop rising. However, as explained hereinbefore the axial movement of the secondary piston is limited to a small range, the pressure in the first chamber starts rising after a negligibly short delay. In this condition, the pressure $P_1'$, developed in the first chamber $R_1$ in the failure of the second circuit $C_2$, and the pressure $P_1$, developed when the dual circuits are both intact, will satisfy the following relation which is induced through the steps carried out with respect to the equations (3), (4) and (5):

$$P_1' = 2 \cdot P_1 \tag{6}$$

The above relation indicates that the pressure $P_1'$ developed in the first chamber in the failure of the second circuit is two times the pressure developed in same when the dual circuits are both intact.

Accordingly, it will be understood that the braking system incorporated with the tandem master cylinder of the invention only leads to negligibly small losses in pedal stroke and can maintain a constant braking capacity in the failure of the second circuit as in the failure of the first circuit. Accordingly, the failure of the second circuit can not give the driver any shock.

From the above description, it will be appreciated that the tandem master cylinder according to the present invention has a simple and compact construction particularly with respect to its axial length since the tandem master cylinder of the invention comprises the primary piston which receives therein the secondary piston.

It will be further appreciated that the tandem master cylinder according to the present invention can practically eliminate the losses in pedal stroke in the failure of either one of the dual circuits of the braking system.

It will be still further appreciated that the tandem master cylinder according to the present invention can provide a constant braking capacity of the braking system even in case of failure of either one of the dual circuits, which is quite advantageous since the pedal force needed to obtain the same braking effect as with the intact system is not increased.

It will be still further appreciated that the tandem master cylinder according to the present invention is quite advantageous for ensuring safe driving of automotive vehicles and the safety of drivers.

What is claimed is:

1. In a tandem master cylinder for a split brake system including:

a housing having a main bore;

a primary piston slidably disposed in said main bore and having a secondary bore coaxial with said main bore;

a secondary piston slidably disposed in said secondary bore and cooperative with said secondary bore to form a first pressure chamber situated on one axial side of said secondary piston and also cooperative with said main bore and a part of said secondary bore to form a second pressure chamber situated on the other axial side of said secondary piston, said secondary piston being responsive to the pressure difference between said first and second pressure chambers and movable to reduce said pressure difference;

a spring disposed within said first pressure chamber for urging said secondary piston to a set position;

a return spring disposed within said second pressure chamber for urging said primary piston to a rest position;

first conduit means for selectively hydraulically connecting said first and second chambers to two independent hydraulic sources respectively in accordance with the position of said primary piston;

second conduit means for separately discharging therethrough the hydraulic pressures developed in said first and second pressure chambers; and limiting means for limiting the movement of said secondary piston away from said set position thereof within a predetermined range;

the improvement comprising:

said secondary piston being in the form of a spool to have an annular recess intermediate between the axial ends thereof; and said first conduit means including first and second passageway arrangements which respectively establish communication between said hydraulic sources and said first and second pressure chambers upon quick return of said primary piston to said rest position;

said first passageway arrangement including a first port inlet formed in said housing and constantly in hydraulic communication with one of said hydraulic sources, an annular chamber defined between said secondary bore and said annular recess formed in said secondary piston and constantly in hydraulic communication with said first port inlet, a plurality of apertures formed in said secondary piston for selectively providing communication between said annular chamber and said first pressure chamber, and an annular seal mounted on said secondary piston and operatively connected to said apertures, said annular seal being adapted to regulate selective communication from said annular chamber to said first pressure chamber through said apertures in response to the pressure difference between said annular chamber and said first pressure chamber; and said second passageway arrangement including a second port inlet formed in said housing and constantly in hydraulic communication with the other of said hydraulic sources, a plurality of openings formed in said housing for selectively providing communication between said second port inlet and said second pressure chamber, and an annular seal mounted on said housing and operatively connected to said openings, said second named annular seal being adapted to regulate selective communication from said second port inlet to said second pressure chamber through said openings in response to the pressure difference between said second port inlet and said second pressure chamber.

* * * * *